United States Patent
Nishida et al.

(10) Patent No.: US 8,681,099 B2
(45) Date of Patent: *Mar. 25, 2014

(54) MANIPULATION INPUT DEVICE WHICH DETECTS HUMAN HAND MANIPULATIONS FROM CAPTURED MOTION IMAGES

(71) Applicant: Mitsubishi Electric Corporation, Tokyo (JP)

(72) Inventors: Yoshihiro Nishida, Tokyo (JP); Masayuki Tsuji, Tokyo (JP); Isao Otsuka, Tokyo (JP); Reiko Okada, Tokyo (JP); Kiyoshi Matsutani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/671,931

(22) Filed: Nov. 8, 2012

(65) Prior Publication Data

US 2013/0162535 A1    Jun. 27, 2013

Related U.S. Application Data

(62) Division of application No. 12/289,063, filed on Oct. 20, 2008, now Pat. No. 8,378,970.

(30) Foreign Application Priority Data

Oct. 22, 2007 (JP) .................................. 2007-273870

(51) Int. Cl.
  *G06F 3/033*    (2013.01)
  *G09G 5/08*    (2006.01)

(52) U.S. Cl.
  USPC ........................... 345/158; 382/103; 715/863

(58) Field of Classification Search
  None
  See application file for complete search history.

(56) References Cited

U.S. PATENT DOCUMENTS

| | | | |
|---|---|---|---|
| 8,378,970 B2 * | 2/2013 | Nishida et al. | 345/158 |
| 2005/0025345 A1 | 2/2005 | Ohta et al. | |
| 2005/0063564 A1 | 3/2005 | Yamamoto et al. | |
| 2005/0238202 A1 | 10/2005 | Sato et al. | |

FOREIGN PATENT DOCUMENTS

| | | |
|---|---|---|
| CN | 1661621 A | 8/2005 |
| DE | 10 2004 038 965 A1 | 3/2005 |
| JP | 2001-216069 A | 8/2001 |
| JP | 2005/50177 A | 2/2005 |
| JP | 2005-242694 A | 3/2010 |

* cited by examiner

*Primary Examiner* — Daniell L Negron
(74) *Attorney, Agent, or Firm* — Birch, Stewart, Kolasch & Birch, LLP

(57) ABSTRACT

When a vehicle navigation system is manipulated by taking pictures of a user hand motion and gesture with a camera, as the number of apparatuses and operational objects increases, the associated hand shapes and hand motions increase, thus causing a complex manipulation for a user. Furthermore, in detecting a hand with the camera, when the image of a face having color tone information similar to that of a hand appears in an image taken with a camera, or outside light rays such as sun rays or illumination rays vary, detection accuracy is reduced. To overcome such problems, a manipulation input device is provided that includes a limited hand manipulation determination unit and a menu representation unit, whereby a simple manipulation can be achieved and manipulation can accurately be determined. In addition, detection accuracy can be improved by a unit that selects a single result from results determined by a plurality of determination units, based on images taken with a plurality of cameras.

4 Claims, 11 Drawing Sheets

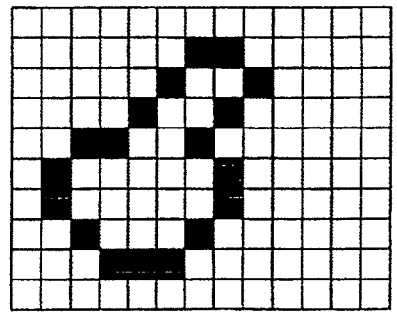
FIG. 6A  direction code
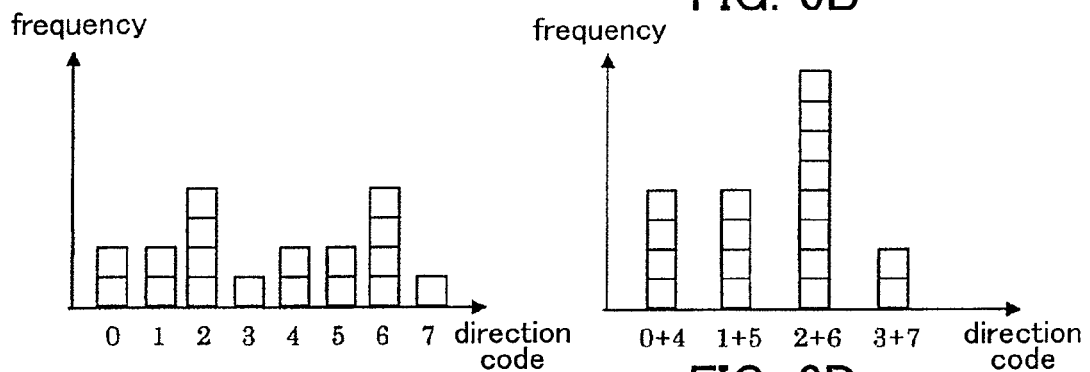
FIG. 6B
FIG. 6C
FIG. 6D
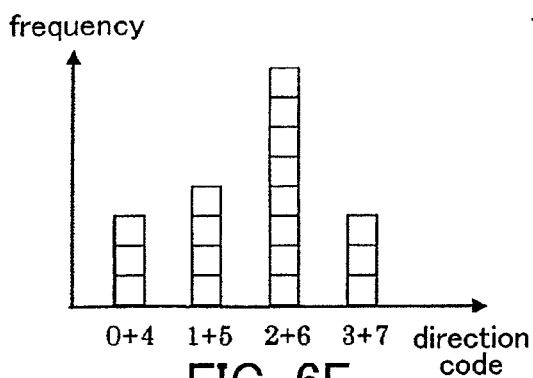
FIG. 6E
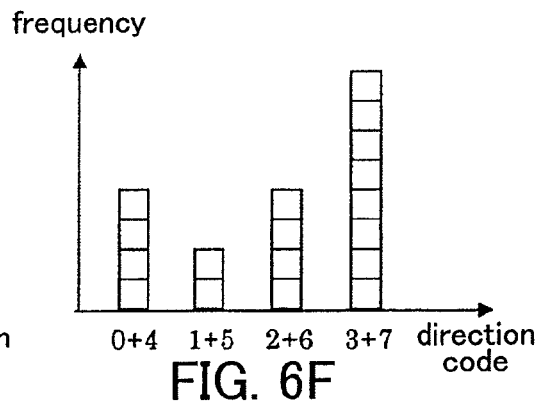
FIG. 6F
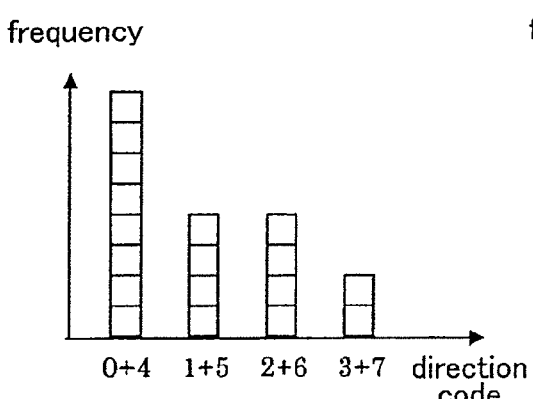
FIG. 6G
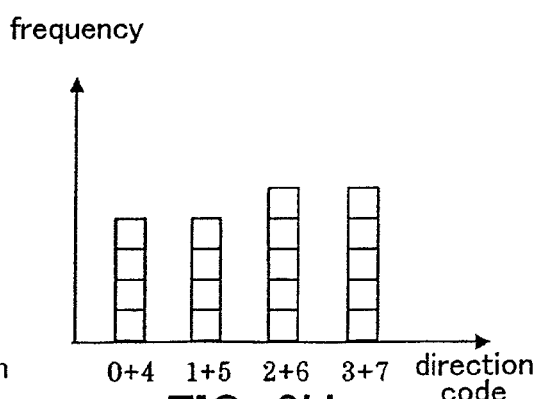
FIG. 6H FIG. 7
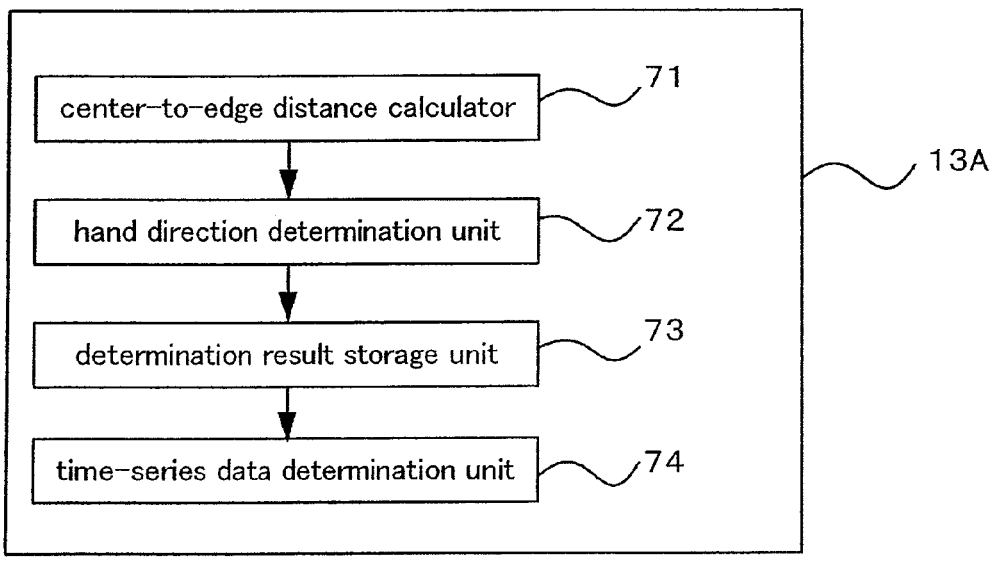
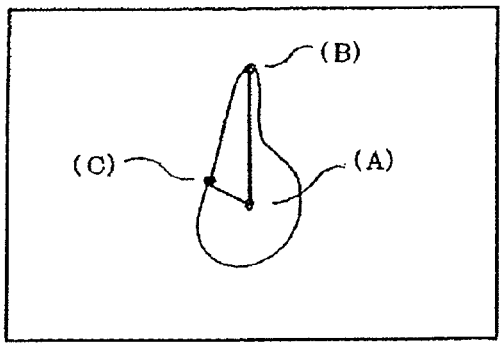
FIG. 8A
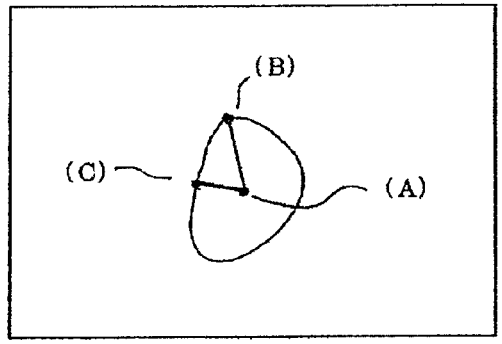
FIG. 8B
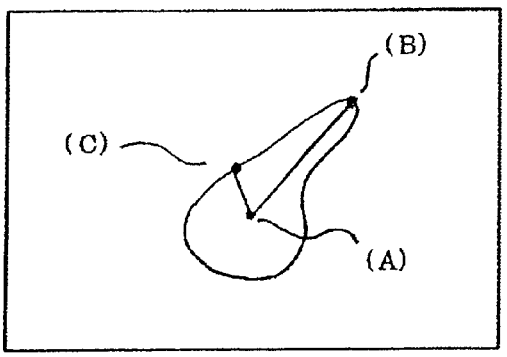
FIG. 8C
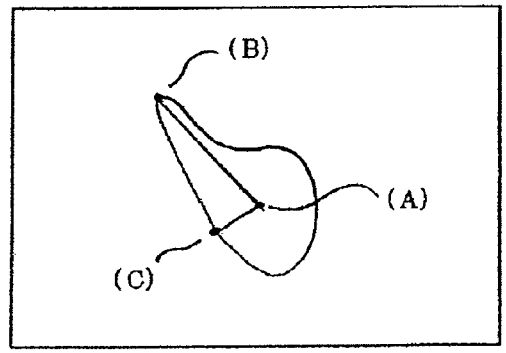
FIG. 8D

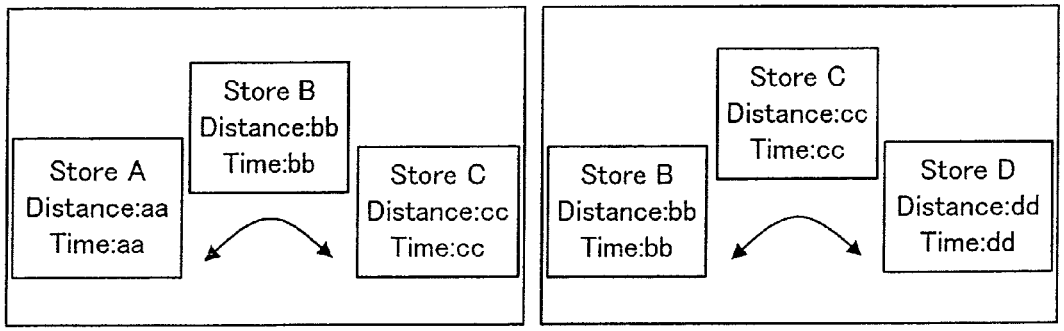
FIG. 9A  FIG. 9B
FIG. 10
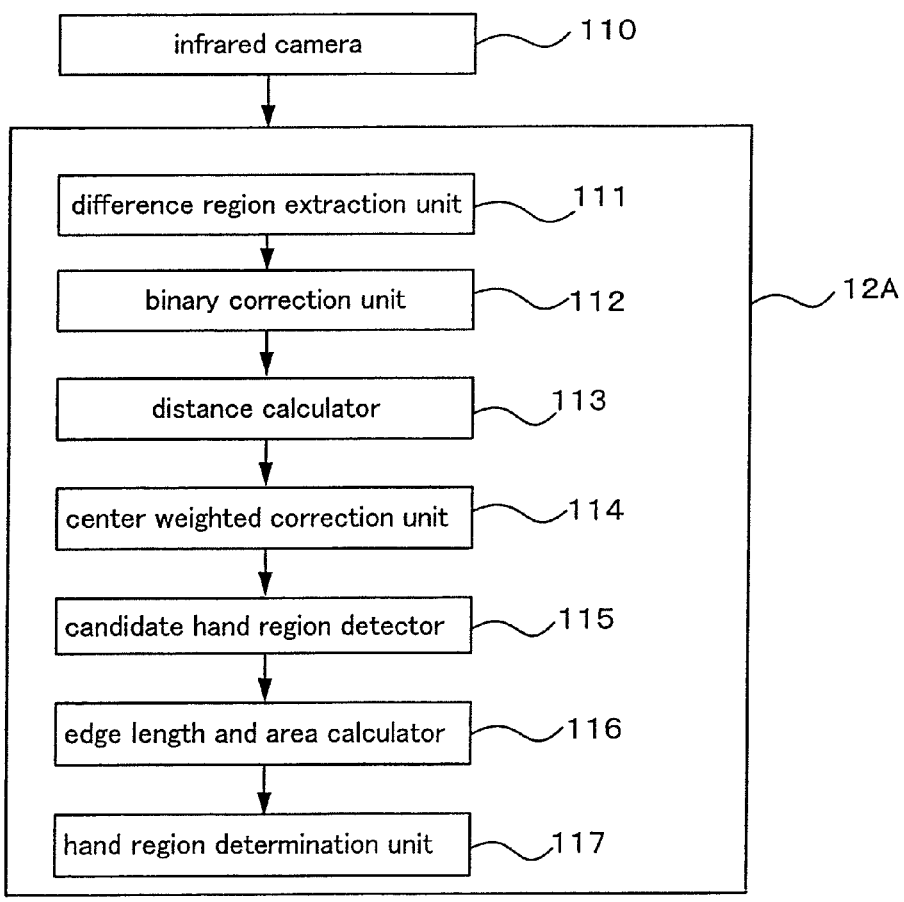

US 8,681,099 B2

MANIPULATION INPUT DEVICE WHICH DETECTS HUMAN HAND MANIPULATIONS FROM CAPTURED MOTION IMAGES

This application is a Divisional of pending U.S. application Ser. No. 12/289,063, filed on Oct. 20, 2008, which claims benefit of Japanese Application No. 2007-273870, filed on Oct. 22, 2007, both of which are hereby incorporated by reference as fully set forth herein.

FIELD OF THE INVENTION

The present invention relates to manipulation input devices that allow users to instruct, by hand manipulations, various information apparatuses including vehicle-mounted information apparatuses.

BACKGROUND OF THE INVENTION

In recent years, many apparatuses, including navigation systems, audio systems and air-conditioners, have been mounted to automotive vehicles; a problem has been that a driver finds it troublesome to watch a display of a manipulation screen and to manipulate buttons in operation of such apparatuses, thus causing eye movement to increase.

The improvement that has been made is to employ a gesture. An apparatus has been proposed in which for instance, a hand shape and a hand motion are detected as a shape gesture and a direction gesture, respectively, by a camera; a manipulation mode is selected by a first gesture; and a parameter in the manipulation mode is varied by a second gesture (e.g., Japanese Unexamined Patent Publication 2001-216069 and Japanese Unexamined Patent Publication 2005-50177).

In the use of such apparatuses, a problem has been that, as the number of apparatuses and operational objects increase, hand shapes and hand motions each corresponding thereto increase, thus increasing the burden of a user learning of many gestures.

Furthermore, when a gesture is detected using a camera image, ambient environment such as brightness significantly affects accuracy in detection. In particular, the ambient environment in an automotive vehicle varies greatly; thus, another problem has been that the gesture is difficult to detect with high accuracy at all times.

SUMMARY OF THE INVENTION

The present invention is directed to overcome the above-described problems. An object of the invention is to provide a manipulation input device that allows for easy gesture manipulation even when the number of apparatuses and operational objects increase.

In addition, another object is to provide a manipulation input device that is capable of detecting with high accuracy a gesture from an image that is taken by a camera, in a variety of ambient environments.

A manipulation input device according to the present invention comprises picture-taking apparatus, a region detector that detects a region of human hand from a motion image taken with the picture-taking apparatus, hand manipulation determination units that each determine a hand manipulation from a shape and a motion of a detected hand region, and a selection menu representation unit that notifies a user of a menu selected based on an determined manipulation.

Furthermore, a manipulation input device comprises a plurality of picture-taking apparatuses; a plurality of hand region detectors that detects a region of a human hand from a motion image taken with the plurality of picture-taking apparatuses; a plurality of hand manipulation determination units that determines a hand manipulation from a shape and a motion of a detected hand region; a hand manipulation determination and selection unit that selects a single result from those determined by the plurality of hand manipulation determination units; and a selection menu representation unit that notifies a user of a menu selected based on a manipulation selected by the hand manipulation determination and selection unit.

An advantageous effect is that since the device according to the invention is configured as described above and a menu selected by a simple manipulation is notified to a user, even if the number of devices or operational objects increase, simple manipulation can be achieved without increasing the number of hand motions and/or hand shapes that are required for manipulation input.

Another advantageous effect is that since the device uses a plurality of different kinds of cameras and is configured to select a single result from among those determined by a plurality of hand manipulation determination units, high detection accuracy in a variety of ambient environments is achieved. These and other features, advantages and objects of the present invention will be further understood and appreciated by those skilled in the art by reference to the following drawings.

BRIEF DESCRIPTION OF THE DRAWINGS

FIG. 6A is a view illustrating an example of a direction code in Embodiment 1 according to the present invention; FIG. 6B shows an example of an edge therein and FIGS. 6C, 6D, 6E, 6F, 6G and 6H are views illustrating edge direction histograms therein;

FIG. 7 is a block diagram of another hand manipulation determination unit in Embodiment 1 according to the present invention;

FIGS. 8A, 8B, 8C and 8D are views each illustrating a hand direction determination unit in Embodiment 1 according to the present invention;

FIGS. 9A and 9B are views each illustrating representation and manipulation of searched candidates in Embodiment 1 according to the present invention;

FIG. 10 is a block diagram of a hand region detector in Embodiment 2 according to the present invention;

DESCRIPTION OF THE PREFERRED EMBODIMENTS

Embodiment 1

Figure 1:
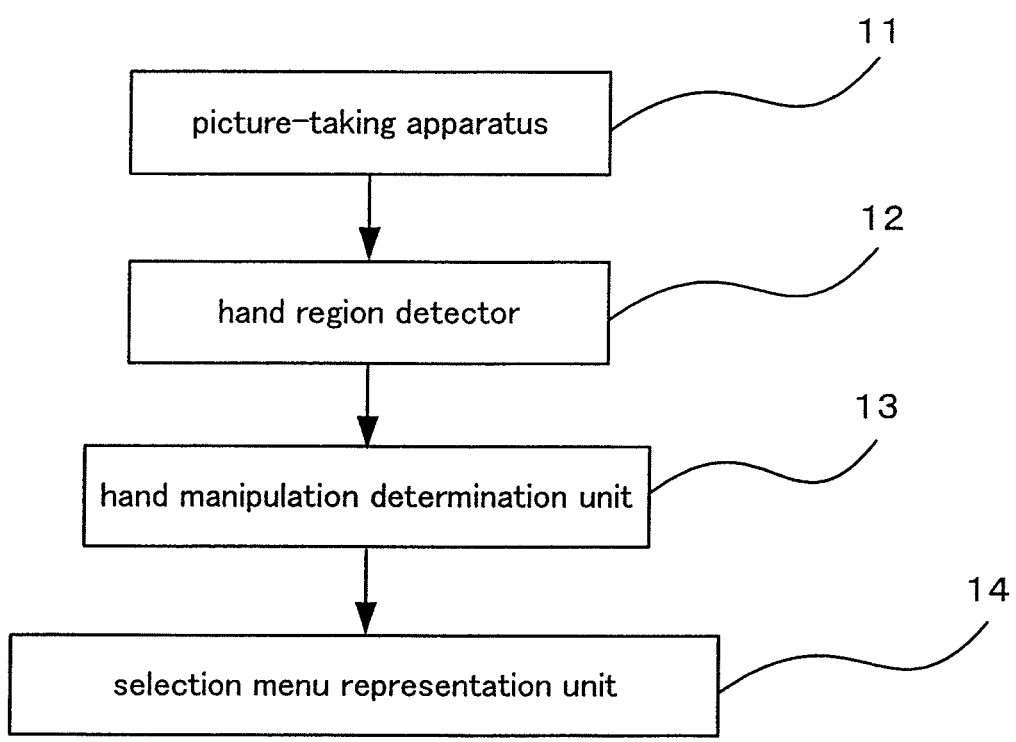
FIG. 1 is a block diagram showing a manipulation input device in Embodiment 1 according to the present invention.

FIG. 1 is a block diagram showing a manipulation input device in Embodiment 1 for implementing the present invention; the manipulation input device comprises, for example, a picture-taking apparatus 11 such as a visible light camera or an infrared camera for taking pictures of a driver's hand extended out into a side area of a steering wheel; a hand region detector 12 that detects a region of a hand from a video signal of a motion image taken with the picture-taking apparatus 11; a hand manipulation determination unit 13 that determines a hand manipulation from a shape and a motion of a detected hand region; and a selection menu representation unit 14 that notifies a user of a menu selected based on the manipulation determined by the hand manipulation determination unit 13.

Figure 2:
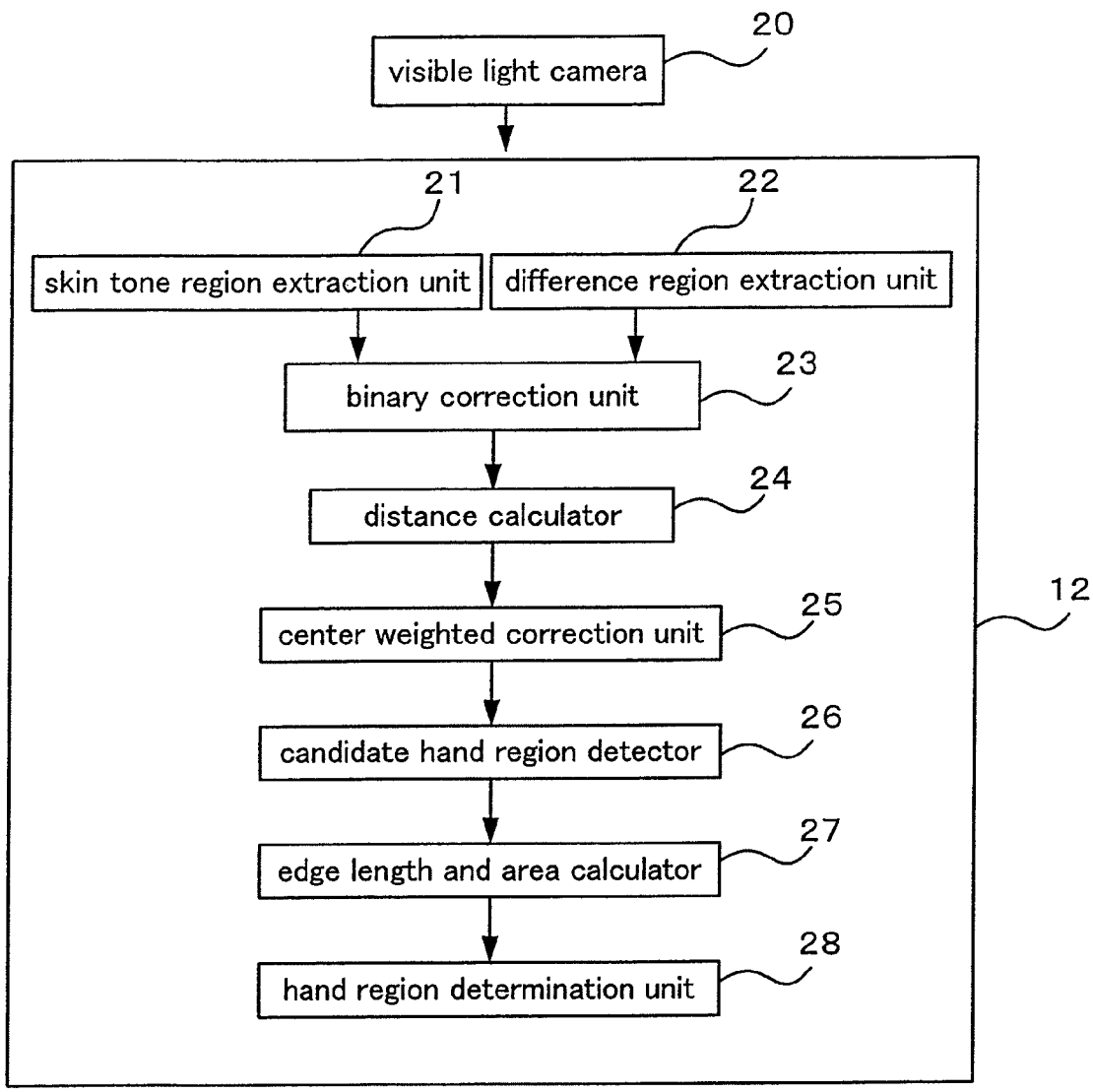
FIG. 2 is a block diagram showing a configuration of a hand region detector in Embodiment 1 according to the present invention.

FIG. 2 is a block diagram showing a configuration of the hand region detector 12 in situations where a visible light camera 20 is used as the picture-taking apparatus 11. The hand region detector 12 comprises a skin tone region extraction unit 21, a difference region extraction unit 22, a binary correction unit 23, a distance calculator 24, a center weighted correction unit 25, a candidate hand region detector 26, an edge length and area calculator 27, and a hand region determination unit 28. The skin tone region extraction unit 21 extracts a region of a skin tone from a video signal of a motion image taken with the visible light camera 20. The difference region extraction unit 22 generates a background image from a video signal of a motion image taken with the visible light camera 20, to extract a region of a difference between the background image and a current motion image. The binary correction unit 23 digitizes and corrects image data of a region extracted by the skin tone region extraction unit 21 and the difference region extraction unit 22. The distance calculator 24 calculates minimum distances from inner points of the binary image region obtained by the binary correction unit 23 to an edge thereof, to detect as the center of a hand a distance maximum point where the calculated values become a maximum one. The center weighted correction unit 25 adds to a distance value of the distance maximum point a correction value where the closer a position of the distance maximum point is to the center of an imaging screen, the larger the correction value and the closer a position of the distance maximum point is to the end thereof, the smaller the distance correction value. The candidate hand region detector 26 detects, as a candidate hand region, a region within a predetermined distance apart from the distance maximum point among binary image regions that include a point in which a correction-value-added value is maximum one. The edge length and area calculator 27 calculates the length of an edge and the area of a region by tracing the edge of a candidate hand region detected by the candidate hand region detector 26. The hand region determination unit 28 determines whether or not the candidate hand region is a hand from the edge length and the area obtained by the edge length and area calculator 27.

Figure 3:
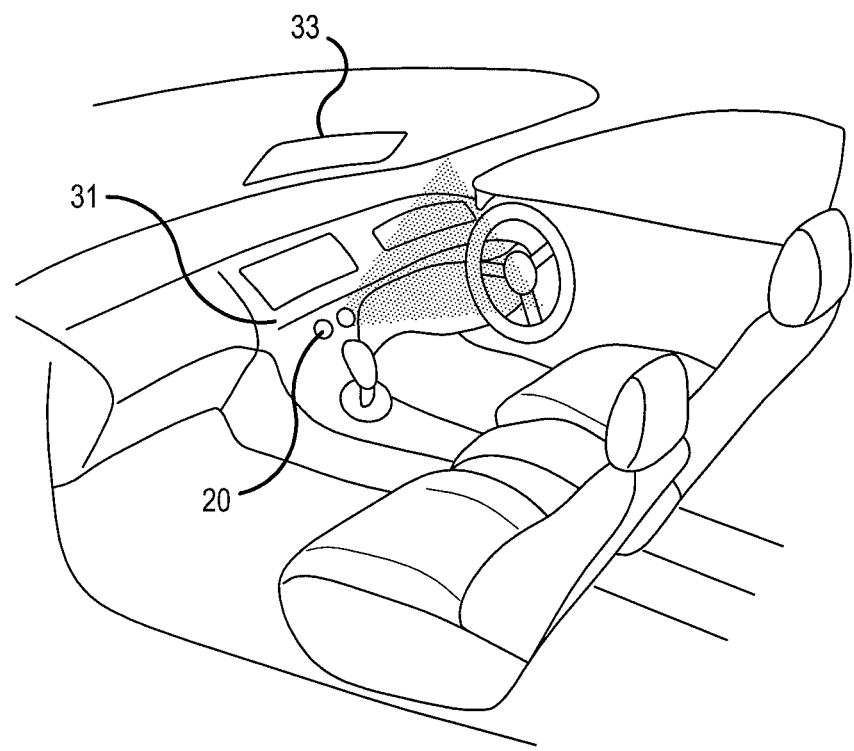
FIG. 3 is a pictorial view illustrating an example of a configuration of devices disposed in the vicinity of a driver seat for a right-hand drive vehicle, in Embodiment 1 according to the present invention.

FIG. 3 shows an example of a configuration of the device. The visible light camera 20 takes pictures of the vicinity of the side of a steering wheel. Based on a hand manipulation there, a menu is displayed by an overlay image display device 33 on a front window. It is safe that a hand motion and a gesture manipulation be made exactly beside a steering wheel, with a small movement. Further, it is preferable that the visible light camera 20 to take pictures of a hand be installed in such a place where a hand in manipulation is located in the center of an image, a user face or a scene outside the window, which is disturbance, is not displayed, nor does back light occur. For instance, as shown in FIG. 3, the visible light camera 20 is installed in the vicinity of the center lower portion of a dashboard 31, to therefrom take pictures of the vicinity of the side of the steering wheel in the obliquely upper direction therefrom. Here, FIG. 3 shows only the example of the placement of the device in a right-hand drive vehicle; an example thereof in a left-hand drive vehicle, which is opposite that of the right-hand drive vehicle, is omitted.

Figure 4A:
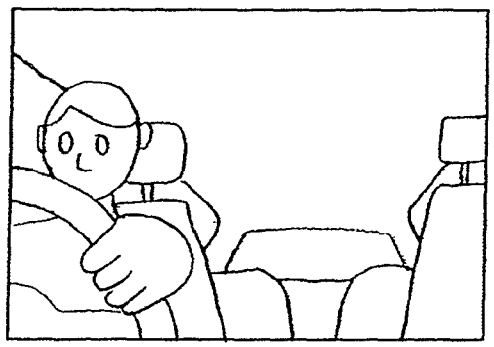
FIGS. 4A, 4B, 4C, 4D, 4E, 4F, 4G and 4H show pictorial views illustrating images and detection regions in Embodiment 1 according to the present invention.
Figure 4B:
Figure 4C:
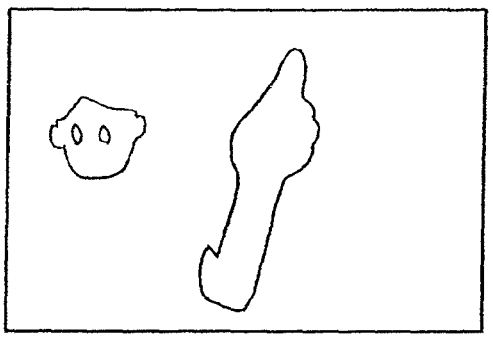

An image taken with the visible light camera 20, such as image shown in FIG. 4A is output therefrom. When a driver extends his or her hand into a manipulation area around the side of the steering wheel, such as an image shown in FIG. 4B is output therefrom. At this time, when a skin tone region is extracted using the skin tone region extraction unit 21, a user face region and a hand region such as in FIG. 4C are extracted. Here, a skin tone extraction that enables brightness influence to reduce is made by converting the skin tone region to HSV (hue, saturation, and value) color space.

HSV color space conversion allows a skin tone region to be broadly detected against variations of the skin tone and brightness owing to back light and the like. However, other than the hand that is wanted to be detected, the skin tone region also includes faces of a driver and passengers that are not wanted to be detected. Further, when there exists a seat or a ceiling whose color is similar to the skin tone, such a region is to be detected as well.

Figure 4D:
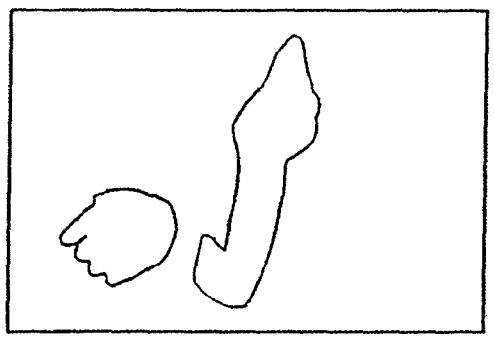

In contrast, the difference region extraction unit 22 detects a region such as that shown in FIG. 4D, in which the difference is large between the background image such as that shown in FIG. 4A and the current image such as that shown in FIG. 4B. In this example, since a hand position shown in FIG. 4A is different from that shown in FIG. 4B, two kinds of regions of the hand—before and after movement of the hand—are detected as the difference between images as shown in both figures. A problem with the extraction of a difference region is that when there is no movement watched for some period, an object that is not desired to be the background is made to be the background. Another problem is that in situations where the image signal level of the background image is close to that of the object image, difference region data cannot be well extracted.

Figure 4E:
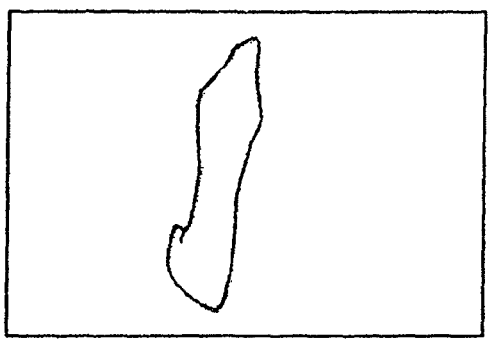

For that reason, the binary correction unit 23 corrects the detected region based on the outputs from the skin tone region extraction unit 21 and the difference region extraction unit 22. More specifically, logical ORs of both regions are calculated, and by the processing of expansion, contraction and filtering, a small blank region is filled and a small protrusion region and a noise are eliminated. By carrying out these processes, for instance, a region as shown in FIG. 4E is gained; one or more binary image regions are gained using the binary correction unit 23.

Figure 4F:
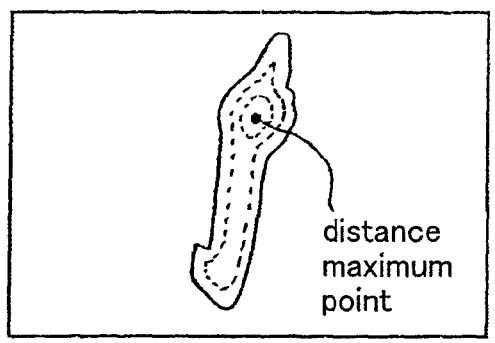
Figure 4G:
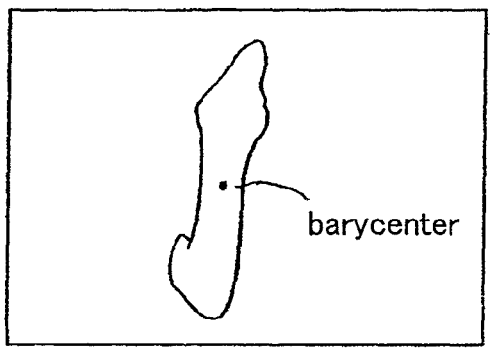

The distance calculator 24 calculates a minimum distance from an inner point to an edge in each of the binary image regions gained by the binary correction unit 23, to detect a distance maximum point where the calculated value is a maximum, thereby assigning this point as a candidate hand center. In FIG. 4F, a plurality of closed curves in the extraction region is a set of points where the above-described minimum distances are equal to each other; a distance maximum point signified by a small black circle is the candidate hand center. Here, the reason that the barycenter of the region is not assigned as the hand center is that when an arm region in a sleeveless dress as shown in, for instance, FIG. 4G is detected, the barycenter of the region is located not in the hand, but in the arm.

Figure 4H:
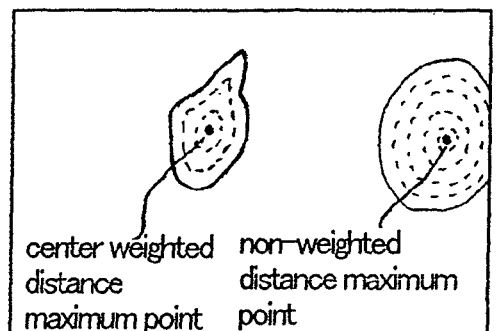

The center weighted correction unit 25 adds to the distance value of the distance maximum point a correction value such that the closer the position of the distance maximum point is to the center of the imaging screen, the larger the correction value; the closer the position thereof is to the end of the imaging screen, the smaller the correction value. The reason that such center weighted correction is made to detect an image as a candidate hand region is that there is a high likelihood of a hand—which is a detection object—being positioned in the center of the imaging screen, and that there is a high likelihood of an object—which serves as disturbance like a face—being positioned near the end portion thereof. In situations where, for instance, as shown in FIG. 4H, a hand is detected in the vicinity of the screen center and a face region in the right side of the screen, simple distance maximum point computed only by the distance calculator 24 is higher in face, resulting in the detected face image being mistakenly determined to be a candidate hand. However, correction of the error detection using the center weighted correction unit 25 allows detection of a hand region located near the center as a candidate hand.

An advantageous effect is that even if the disturbance region detected in the edge of the screen is larger than that in the center thereof by adding the center weighted correction unit 25, the hand in the center of the screen can be detected. It should be noted that in the above-described example, the correction value has been added to the calculation result of a distance at the distance maximum point; however, multiplication of the calculation result by the correction value achieves the same effect as well.

Next, the candidate hand region detector 26 detects a point where the distance value of the distance maximum point corrected by the center weighted correction unit 25 turns out to be the maximum, to select as a candidate hand region a region portion that is above from the distance maximum point—which is the hand center—among binary image regions containing the maximum point. Another method of detecting the candidate hand region may be such that a region within a predetermined distance from the distance maximum point is assigned as a candidate hand region.

For a region gained using the candidate hand region detector 26, the edge length and area calculator 27 calculates the length of the edge and the area of the region by tracing the edge of the binary image region.

The hand region determination unit 28 determines whether the edge length and region area calculated using the edge length and area calculator 27 are within predetermined ranges. If within the ranges, then the region is determined to be the hand region, with the determination information being output from the hand region detector 12.

Figure 5:
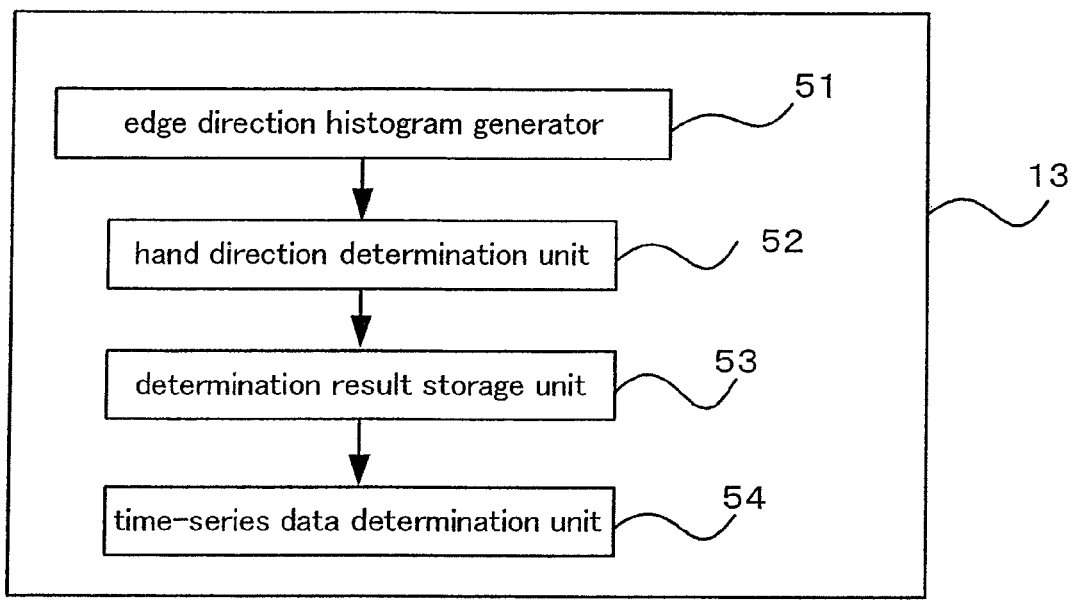
FIG. 5 is a block diagram showing a configuration of the hand manipulation determination unit in Embodiment 1 according to the present invention.

FIG. 5 is a block diagram showing an example of a configuration of the hand manipulation determination unit 13. The determination unit 13 is configured by an edge direction histogram generator 51 that codes edge directions for a region detected by the hand region detector 12, to produce a histogram representing frequency distribution of the edge directions; a hand direction determination unit 52 that derives a frequency of direction data from the histogram generated using the edge direction histogram generator 51, to detect an inclination of the hand region from the result; a determination result storage device 53 that stores a result for a predetermined time, determined by the hand direction determination unit 52; and a time-series data determination unit 54 that determines a hand manipulation, including motion information, from the result for the predetermined time, stored in the determination result storage device 53.

For the edge of the binary image region detected by the hand region detector 12, the edge direction histogram generator 51 codes the edge direction according to, e.g., a direction code as shown in FIG. 6A, to thereby create an associated histogram. For instance, in the region in which pixels are shown as enlarged in FIG. 6B for simplified illustration (for easy viewing), the edge—pixels painted in black in the figure—is traced in the counterclockwise direction, to then generate a histogram for the entire perimeter, as shown in FIG. 6C.

The hand direction determination unit 52 determines a hand inclination from the histogram generated by the edge direction histogram generator 51. In the histogram of FIG. 6C, by summing together data corresponding to two codes that are located in a mutually opposite direction in FIG. 6A, the histogram is converted to that as shown in FIG. 6D. The hand direction is determined by deriving from the histogram, data with a high frequency of occurrence. For instance, determinations are made as follows: in a case where, as is shown in FIG. 6E, there are many data in the obliquely upper right direction (direction code 6) and in the obliquely lower left direction (direction code 2), the hand is determined to be slanted in the obliquely upper right direction; in a case where there are many data in the upper and lower direction (direction codes 3 and 7) as shown in FIG. 6F, the hand is determined to be straight upward; in a case where, as is shown in FIG. 6G, there are many data in the obliquely upper left direction (direction code 0) and in the obliquely lower right direction (direction code 4), the hand is determined to be slanted in the obliquely upper left direction; and in a case where, as is shown in FIG. 6H, any data are substantially equal to each other, fingers are determined to be bent. Use of the edge direction histogram in this way allows detection of a hand inclination state and fingers bending/straightening motion.

The determination result storage device 53 stores the result determined by the hand direction determination unit 52. The time-series data determination unit 54 determines a hand manipulation based on the result for the predetermined time in the determination result storage device 53. A single time of the determination can be done even by a single frame of the image. Determination as several frames of time-series information can improve detection accuracy, which thus enables detection inclusive of motion information like a hand wave manipulation. Further, several-frame determination ensures a determination, e.g., in situations where disturbance occurs such as a momentary hand reach-out for a different purpose, or headlights entering from an oncoming vehicle as well.

FIG. 7 is a block diagram showing an example of another configuration of the hand manipulation determination unit 13, which is constituted by a center-to-edge distance calculator 71 that calculates a distance from the center of a hand region detected by the hand region detector 12 to all the points on the edge of the hand region; a hand direction determination unit 72 that determines a hand direction from distances and directions of two lines connecting from two points where the distances calculated by the center-to-edge distance calculator 71 are a maximum and a minimum, to the center of the hand region; a determination result storage device 73 that stores for a predetermined time a result determined by the hand direction determination unit 72; and a time-series data determination unit 74 that determines a hand manipulation including motion information from the result for the predetermined time, stored by the determination result storage device 73.

By tracing the edge of the binary image region detected by the hand region detector 12, the center-to-edge distance calculator 71 calculates a point where the distance from the hand center to the edge is a maximum and its distance value, and a point where the distance therefrom is a minimum and its distance value. When, for instance, an index finger is straightened, the point where the distance from the hand center point A is a maximum as shown in FIG. 8A, is detected as the finger tip B; a point where the distance therefrom is a minimum is detected as the first position C.

The hand direction determination unit 72 can determine a hand manipulation from points and distances calculated by the center-to-edge distance calculator 71, and more specifically, a finger bending/straightening by a ratio of a distance A to B to a distance A to C, and a finger direction from a direction vector A to B. For instance, when as shown in FIG. 8B, the distance A to B is smaller than two times the distance A to C, the fingers are determined to be closed; when as shown in FIG. 8C, the distance A to B is greater than two times the distance A to C, and the point B is in the upper right direction of the hand center point A, the hand is determined to be inclined in the obliquely upper right direction. In this way, a hand inclination state and a finger bending/straightening motion can be detected from the hand center, a position of the finger tip and a position of the fist.

The determination result storage device 73 and the time-series data determination unit 74, which are in the subsequent processing stage, are the same as the determination result storage device 53 and the time-series data determination unit 54 as shown in FIG. 5, respectively.

It is preferable that a manipulation determined by the hand manipulation determination units 13 or 13A is such that even in any situation or a hierarchical menu structure, a constant manipulation can be performed and the manipulation is user-intuitive. The above-described two hand manipulation determination units enables, for instance, a candidate selection menu to be sequentially varied by the manipulation of an index finger straightening and then inclining; a selected menu to be executed by the manipulation of the finger bending such as in button depressing; and the menu to be cancelled by the manipulation of a hand waving in order to represent a denial when a return process is wanted. By using such hand gestures, the user can move and scroll through at least the candidate menu in the hierarchy, to select a desired menu and then execute it. Thus, the above-described hand manipulation determination units 13 or 13A allow for simple manipulation, without increasing the number of hand shapes or hand motions required for manipulation input, even when the number of apparatuses or operational objects increases.

As described above, description on two hand manipulation determination units has been made. Both ones or either one may be used.

The selection menu representation unit 14 in FIG. 1 provides a voice message or an image data representing a menu selected based on manipulation determined using the hand manipulation determination unit 13, to thereby notify a user of the menu. In representation of the image, for instance, the selected menu is displayed using the overlay image display device 33 disposed above the front window as shown in FIG. 3.

The manipulation input device according to the present invention can be coupled to a car navigation system with voice recognition. For instance, when a user pronounces "nearby convenience store," the car navigation system with voice recognition searches a convenience store, to represent a candidate one thereon. The system has a function of selecting a destination using a touch sensitive screen and a selection button. In contrast, for example, as in FIG. 9A, candidate stores are displayed without user touching the touch sensitive screen and selection button, e.g., with a hand inclined rightward, and the candidates scrolled as in FIG. 9B, a manipulation of bending a finger allows the destination to be determined.

Embodiment 2

FIG. 10 is a block diagram showing a manipulation input device in Embodiment 2 for implementing the present invention. The manipulation input device comprises a difference region extraction unit 111 that produces a background image from a video signal of a motion image taken with an infrared camera 110, to thereby extract a region of a difference between the background image and the current motion image taken with a picture-taking apparatus; a binary correction unit 112 that digitizes image data of a hand region from information of the difference region extraction unit 111 and then corrects the digitized image data; a distance calculator 113 that calculates pixels of binary image regions of the hand region obtained by the binary correction unit 112, and the minimum distance up until the end portion of an imaging screen region; a center weighted correction unit 114 that adds to a calculation result by the distance calculator 113 a correction value such that the closer the position is to the center of an imaging screen, the larger the correction value, and the closer the position is to the end portion of the imaging screen, the smaller the correction value; with a position where the output from the center weighted correction unit 114 is a maximum being the center of the hand, a candidate hand region detector 115 that detects, as a candidate hand position, binary image regions including the center of the hand; an edge length and area calculator 116 that calculates an edge length and region area by tracing the edge of the binary image region obtained by the candidate hand region detector 115; and a hand region determination unit 117 that determines whether or not the binary image region is a hand from an edge length and an area obtained by the edge length and area calculator 116.

Figure 11:
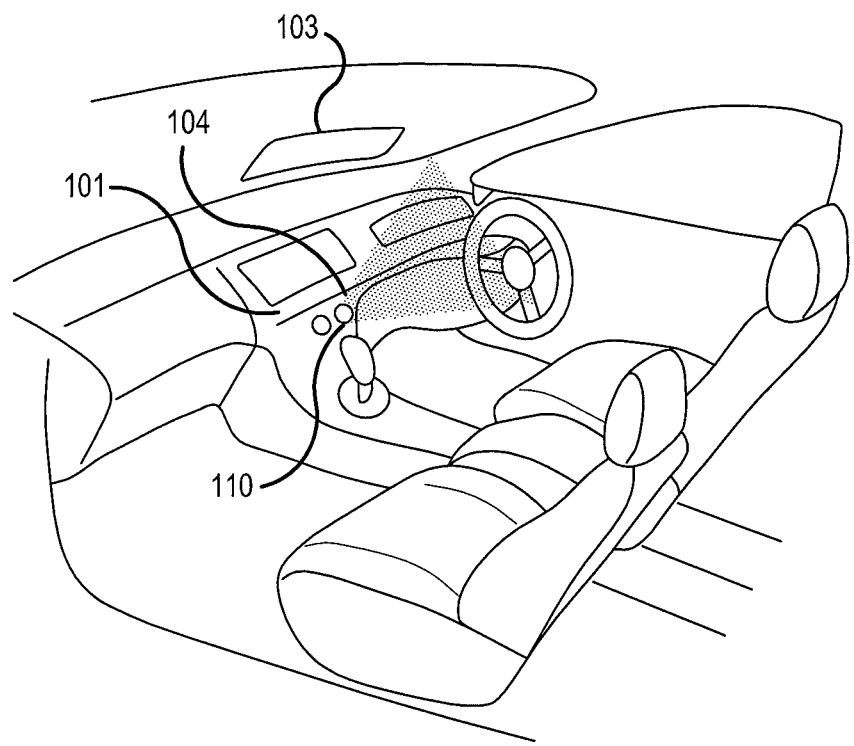
FIG. 11 is a pictorial view illustrating an example of a configuration of devices disposed in the vicinity of a driver seat for a right-hand drive vehicle, in Embodiment 2 according to the present invention.

FIG. 11 is a view showing an example of a configuration of device in Embodiment 2. In the case of Embodiment 1 the visible light camera 20 serves as the picture-taking apparatus. In the present embodiment, the infrared camera 110 is used as picture-taking apparatus. An infrared LED 104 in the light emitter is added. Here, FIG. 11 shows only the example of the placement of the device in a right-hand drive vehicle; an example thereof in a left-hand drive vehicle, which is opposite that in the right-hand drive vehicle, is omitted.

An image taken from the infrared camera 110 depends upon brightness in the ambient environment. When the infrared LED 104 is capable of emitting sufficient infrared rays in comparison with the ambient infrared ray level, as shown in FIG. 12A, a hand portion that is near the infrared LED 104 and the infrared camera 110, can gain an image of a high brightness level due to much of reflection components of the infrared rays; the background can gain an image of a low brightness level due to the low amount of reflection.

Figure 12A:
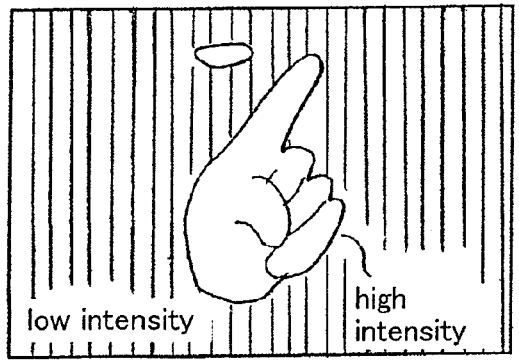
FIGS. 12A, 12B, 12C, 12D and 12E are pictorial views illustrating images and detection regions in Embodiment 2 according to the present invention.
Figure 12B:
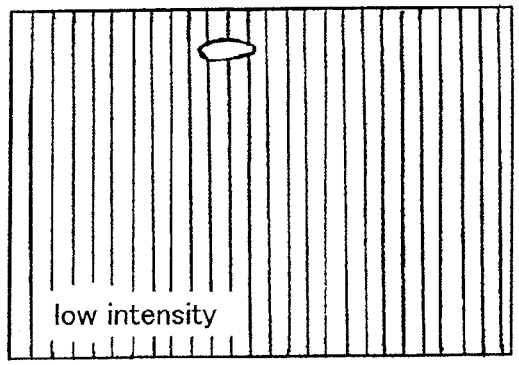
Figure 12C:

The difference region extraction unit 111 detects a region of FIG. 12C where there is a large difference between the background image of FIG. 12B and the image of FIG. 12A. As with the visible light camera 20, although the problem is that the hand as a detection object is made to be the background image when no hand motion occurs for some period, an advantage is that unlike the visible light camera 20, even when there exists in the background a color tone subject or a bright subject similar to the hand, the difference in the distance from the infrared LED 104 or the infrared camera 110 allows the subject in the background to be distinguished from the hand.

Figure 12D:
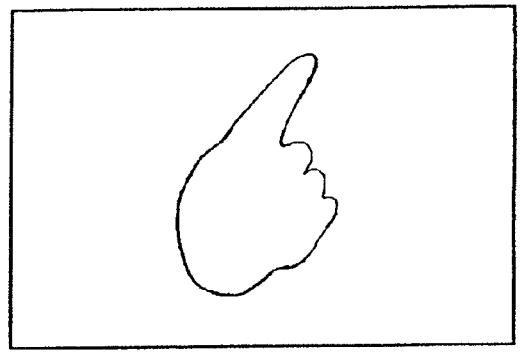

The binary correction unit 112 corrects such as filling a small blank and deleting a small protrusion region and a noise, by the processing of expansion, contraction and filtering in the region detected by the difference region extraction unit 111, to thereby gain a region as shown in FIG. 12D.

The distance calculator 113, the center weighted correction unit 114, the candidate hand region detector 115, the edge length and area calculator 116 and the hand region determination unit 117, which are in the subsequent processing stage, are the same as the distance calculator 24, the center weighted correction unit 25, the candidate hand region detector 26, the edge length and area calculator 27 and the hand region determination unit 28, as are shown in FIG. 2, respectively.

However, when the infrared camera 110 serves as the picture-taking apparatus 11 as in the present embodiment, the center weighted correction unit 114 can be omitted. This is because, by directing the infrared LED radiation toward a hand manipulation position, even if the image of a face appears at the end portion of an image taken with the infrared camera 110, an infrared ray level shone on and reflected by the face is lower than that of a hand portion in the screen center, which thus results in reduction in the corresponding image signal level.

Figure 12E:
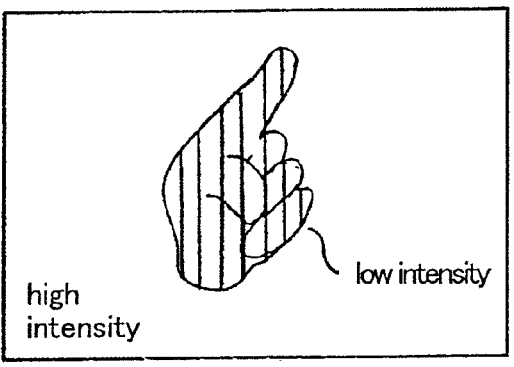

In situations where in comparison with the infrared level in the ambient environment an infrared level by the infrared LED 104 is low—for instance, when, even though the infrared LED 104 is located near a hand, infrared rays more than its reflection content strike, such as sunset rays entering directly from a window—an image is gained whose background has, as shown in FIG. 12E, a high brightness level and hand portion, a low bright level, by switching off the infrared LED 104 and a hand can be detected using the difference region extraction unit 111. An infrared ray level in the ambient environment can be determined based on an average brightness level of a background image retained by the difference region extraction unit 111, or a brightness level that is weighted on the periphery of the background image.

In the present embodiment, near-infrared rays are used as infrared rays; use of the far-infrared rays also can achieve the same action. Using far-infrared rays, however, will not require the infrared LED 104 in the light emitter.

Embodiment 3

Figure 13:
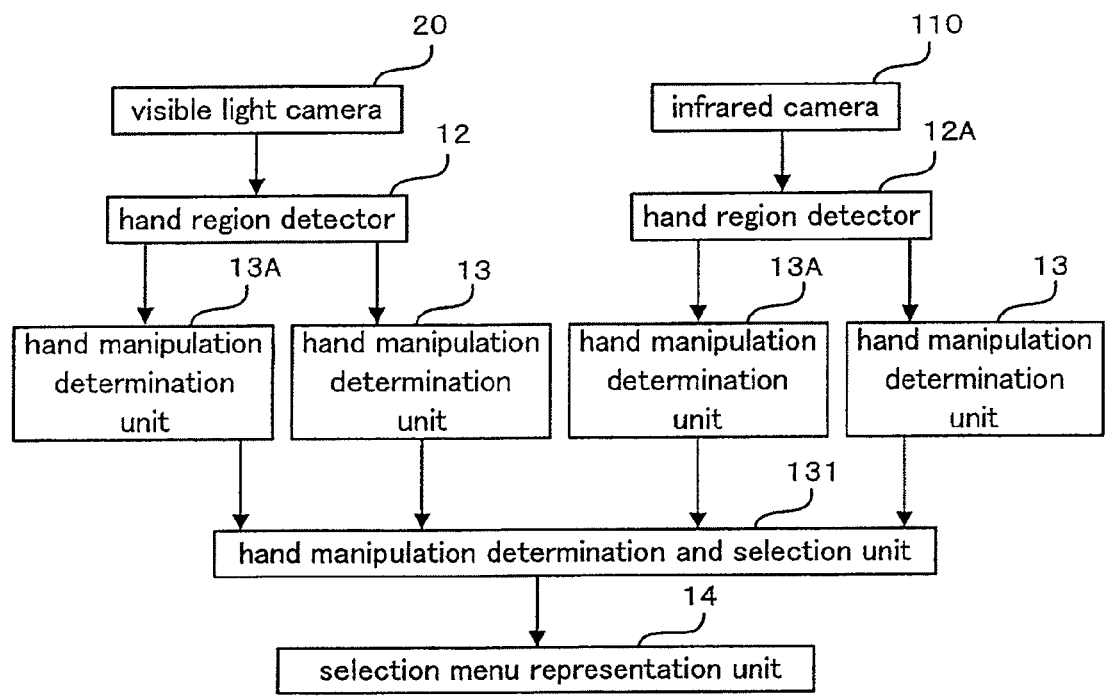
FIG. 13 is a block diagram of a manipulation input device in Embodiment 3 according to the present invention.

FIG. 13 is a block diagram showing a manipulation input device in Embodiment 3 for implementing this invention. The device according to the invention comprises the visible light camera 20 and the infrared camera 110 as the picture-taking apparatus 11. It also comprises the hand region detector 12 that detects a hand region from a video signal obtained from the visible light camera 20; hand manipulation determination units 13 and 13A that each determine manipulation using mutually differing methods from a hand region detected by the hand region detector 12; a hand region detector 12A that detects a hand region from a video signal obtained from the infrared camera 110; hand manipulation determination units 13 and 13A that each determine manipulation using mutually differing methods from a hand region detected by the hand region detector 12A; a hand manipulation determination and selection unit 131 that selects a single result from a plurality of results determined by a plurality of hand manipulation determination units by using the visible light camera 20 and from those determined by the plurality of hand manipulation determination units by using the infrared camera 110; the selection menu representation unit 14 that notifies a user of a menu selected based on a manipulation selected by the hand manipulation determination and selection unit 131.

Figure 14:
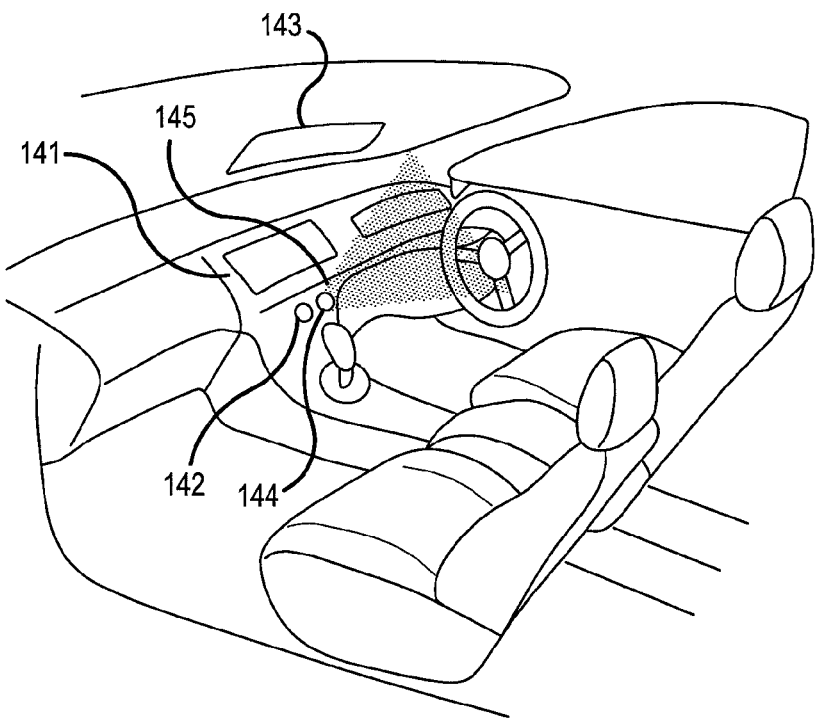
FIG. 14 is a pictorial view illustrating an example of a configuration of devices disposed in the vicinity of a driver seat for a right-hand drive vehicle, in Embodiment 2 according to the present invention.

FIG. 14 is a view showing an example of a configuration and placement of the devices in situations where the device comprises both visible light camera 20 (FIG. 13) and infrared camera 110 (FIG. 13). Processing from visible light camera 20 to a plurality of hand manipulation determination units 13 and 13A, and processing from the infrared camera 110 to a plurality of hand manipulation determination units 13 and 13A, are the same as those in Embodiment 1 and Embodiment 2.

The device in Embodiment 3 comprises the hand manipulation determination and selection unit 131 that selects a plurality of results determined based on images taken with the visible light camera 20 and the infrared camera 110. In the hand manipulation determination and selection unit 131, the simplest method of selection is to determine the result based on the majority rule. A feature thereof is that an accuracy of detection with the visible light camera 20 increases during bright daytime, while the detection accuracy is reduced during dark nighttime; the accuracy of detection with the infrared camera 110 is reduced in daytime when the infrared level of background is high, while the accuracy during night time increases more. Thus, during daytime, a result determined by an image taken using the visible light camera 20 is selected and during nighttime, another result using the infrared camera 110 is selected, whereby detection accuracy can be improved. Whether it is daytime or nighttime can be determined by time information of a clock, or turn-on/turn-off of vehicle lights.

In addition, whether or not there is brightness sufficient to detect with high accuracy using the visible light camera 20 has a great correlation to the infrared level of the image taken with the infrared camera 110. Thus, since detection using the visible light camera 20 is made with high accuracy when the infrared level is high, there exists sufficient brightness.

Consequently, when the infrared level obtained from the infrared camera 110 is lower than a predetermined value, determination using the infrared camera 110 is selected; in contrast, when it is higher, determination using the visible light camera 20 is selected, thereby allowing increase of the detection accuracy.

In addition, if the hand region is not properly detected, the determination by a hand manipulation determination unit cannot properly be made either. Thus, results to be determined by a plurality of hand manipulation determination units are different from each other. For that reason, a result having the smaller difference between the results determined by the plurality of hand manipulation determination units based on images taken with the picture-taking apparatus, is selected, which thereby enhances reliability.

In the present embodiment, positions of installing the visible light camera 20 and the infrared camera 110 are made to be the same lower portion in the center of the dashboard as shown in FIG. 14; however, these cameras may be installed in the neighborhood of an interior rear-view mirror, or in different positions. Here, FIG. 11 shows only the example of the placement of the device in a right-hand drive vehicle; an example thereof in a left-hand drive vehicle, which is opposite that in the right-hand drive vehicle, is omitted. It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A manipulation input device, comprising:
a picture-taking apparatus which include a visible light camera;
a hand region detector that detects a region of a human hand from a motion image taken with the picture-taking apparatus;
a hand manipulation determination unit that determines a hand manipulation from a shape and a motion of the detected hand region; and
a selection menu representation unit that notifies a user of a menu selected based on the manipulation;
wherein the hand region detector comprises:
a skin tone region extraction unit that extracts a region of a skin tone from a motion image taken with the visible light camera;
difference region extraction unit that extracts region data differing between current motion image data and background image data in an image taken with the visible light camera;
a binary correction unit that digitizes image data of the region extracted by the skin tone region extraction unit and the difference region extraction unit, to then correct the digitized image data;
a distance calculator that calculates minimum distances from inner points of the binary image region obtained by the binary correction unit to an edge thereof, to detect as the center of a hand a distance maximum point where the calculated values become a maximum one;
a center weighted correction unit that adds to the distance value of the distance maximum point a correction value such that the closer the position of the distance maximum point is to the center of an imaging screen, the larger the correction value, and the closer the position thereof is to the end portion of the imaging screen, the smaller the correction value;
a candidate hand region detector that detects a hand region from a binary image region that includes a point where the distance value of the distance maximum point to which the correction value is added is a maximum;
an edge length and area calculator that calculates an edge length, and an area, of the candidate hand region; and
a hand region determination unit that determines whether or not the candidate hand region is a hand from the calculated edge length and area.

2. The manipulation input device of claim 1, wherein the hand manipulation determination unit comprises:
an edge direction histogram generator that generates a histogram representing frequency distribution of edge directions in a detected hand region;
a hand direction determination unit that determines a hand direction according to the size of the histogram obtained by the edge direction histogram generator;
a determination result storage unit that stores the result determined by the hand direction determination unit; and
a time-series data determination unit that determines the current hand manipulation from the result for a predetermined time, stored in the determination result storage unit.

3. The manipulation input device of claim 1, wherein the hand manipulation determination unit comprises:
a center-to-edge distance calculator that calculates distances from the center of the hand region detected by the hand region detector to all the points on the edge of the hand region;
a hand direction determination unit that determines a hand direction from distances and directions of two lines connecting the hand region center with two points where calculated distances are the maximum one and the minimum one;
a determination result storage unit that stores the result determined by the hand direction determination unit; and
a time-series data determination unit that determines the current hand manipulation from the result for a predetermined time, stored in the determination result storage unit.

4. The manipulation input device of claim 1, wherein based on the detection result from the hand region detector, the hand manipulation determination unit determines at least one of change, execution, and cancellation, of a candidate menu.

* * * * *